United States Patent
Ge et al.

(10) Patent No.: US 10,297,279 B1
(45) Date of Patent: May 21, 2019

(54) METHODS OF PLANARIZATION FOR DEVICE FABRICATION WITH HEAD FEATURES BACKGROUND

(71) Applicant: Seagate Technology LLC, Cupertino, CA (US)

(72) Inventors: Zhiguo Ge, Edina, MN (US); Shaun E. Mckinlay, Eden Prairie, MN (US); Stacey C. Wakeham, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/949,302

(22) Filed: Apr. 10, 2018

(51) Int. Cl.
*G11B 5/39* (2006.01)
*B24B 37/04* (2012.01)

(52) U.S. Cl.
CPC ............ *G11B 5/39* (2013.01); *B24B 37/048* (2013.01)

(58) Field of Classification Search
CPC .................................................. G11B 5/39
USPC ........................................................ 216/38
See application file for complete search history.

(56) References Cited

U.S. PATENT DOCUMENTS

| | | |
|---|---|---|
| 6,131,271 A | 10/2000 | Fontana, Jr. et al. |
| 6,494,769 B1 | 12/2002 | Sinclair et al. |
| 7,228,619 B2 | 6/2007 | Le |
| 7,813,080 B2 | 10/2010 | Lille et al. |
| 9,536,549 B1 | 1/2017 | Ge et al. |

*Primary Examiner* — Robert P Culbert
(74) *Attorney, Agent, or Firm* — Kagan Binder, PLLC

(57) ABSTRACT

Methods of planarizing materials, such as where surface topographies are created as part of a thin film device fabrication process are described. These methods find particular application in the creation of nano-sized devices, where surface topographical features can be effectively planarized without adversely creating other surface topographies and/or causing deleterious effects a material junctions. Methods include the step of depositing a sacrificial layer overlying at least a portion of a first material layer and at least a portion of a backfilled second material at a junction between the first and second materials. The sacrificial layer substantially retains the surface topography of the microelectronic device. Chemical-mechanical planarization is performed on a surface of the sacrificial layer but leaving a remainder portion of the thickness of the sacrificial layer. Then, physical or dry chemical process is conducted for removing the remainder of the sacrificial layer and at least a portion of at least one of the first and second materials.

13 Claims, 7 Drawing Sheets

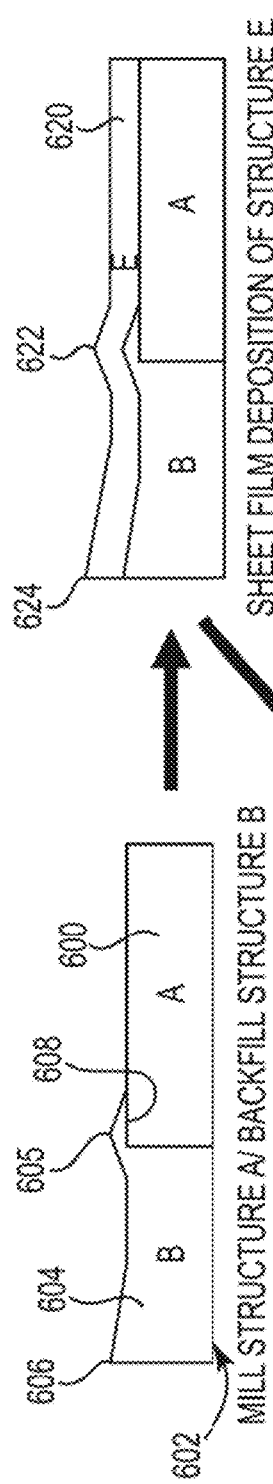
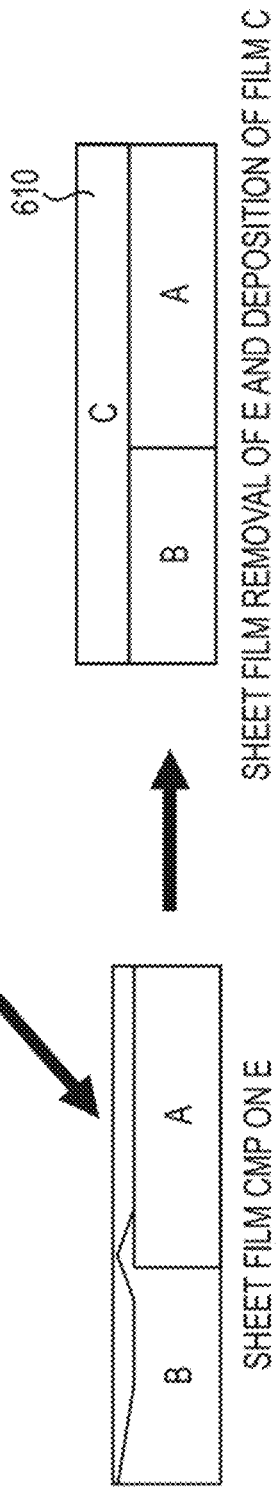
FIG. 6A — MILL STRUCTURE A/ BACKFILL STRUCTURE B
FIG. 6B — SHEET FILM DEPOSITION OF STRUCTURE E
FIG. 6C — SHEET FILM CMP ON E
FIG. 6D — SHEET FILM REMOVAL OF E AND DEPOSITION OF FILM C

METHODS OF PLANARIZATION FOR DEVICE FABRICATION WITH HEAD FEATURES BACKGROUND

TECHNICAL FIELD

The present invention is directed to the fabrication of devices within head sliders for use in hard disk drives, and in particular the to the creation of head devices such as read and write transducer elements as part of a laminated structure within a head slider. The fabrication techniques are useful in the creation of planarization in the build of multi-sensor read head devices.

BACKGROUND

Data storage devices commonly have a recording head that includes a read transducer that reads information from a data storage medium and a write transducer that writes information to a data storage medium.

In magnetic data storage devices such as disc drives, a magnetoresistive (MR) sensor such as a Giant Magnetoresistive (GMR) sensor or a Tunnel Junction Magnetoresistive (TMR) sensor may be employed as the read transducer to read a magnetic signal from the magnetic media. The MR sensor has an electrical resistance that changes in response to an external magnetic field. This change in electrical resistance can be detected by processing circuitry in order to read magnetic data from the adjacent magnetic media.

With ever-increasing levels of recording density in disc drives and a need for faster data transfer speeds, the read transducer needs to have correspondingly better data-reproducing capabilities. A multiple-sensor read device may be of choice of sensor for high areal density, high signal-to-noise ratio in the hard-disk drive based storage system.

To provide multiple read transducer elements, the multiple readers can be stacked to one another within the multilayer portion and topography from the lower structures should be minimized in order to prevent degradation of performance of reader stacked on top. In other words, the planarization of the lower reader in a stacked multiple sensor device is important for the performance of an upper reader stacked on top of the lower reader.

In the process of making functional reader devices, there can be a need to pattern a sheet film of the multilayer thin film portion either with a photoresist or by a hard mask to facilitate the removal of a partial or the entire thick ness of one or more film portions that are not covered by the photo-resist or mask. The removal process typically comprises an ion milling process that is controlled based upon the level of film layer removal that is required to create a desired thin film structure. After the milling process is complete, the structure of the thin film may then be backfilled with another material or structure as part of a functional device. Then, the photo-resist or mask is stripped or lifted off from the etched film layer, leaving the structured thin film layer backfilled with other material, the combination structure of which can be utilized in functional device fabrication. For example, in creating read elements, a thin film metal layer can be deposited over the backfilled combination structure.

Specifically, in the case of milling a structure within a layer utilizing a mask or photo-resist material followed by backfilling with other material, surface topographical effects can be seen, especially with devices in the nanometer size range. Topography can form as a result of shadow effects of the photo-resist or hard mask to a milling process. Or, topography can form as a result of the deposition of the backfilled material. The area of the juncture of the structured layer and the backfilled material is an area where topography, such as an outward bump can form. With nano-sized devices, bumps, recesses and other surface features can form that are typically within the range of 10-100 nanometers. This topography will then propagate to a further layer or structure that is deposited over the backfilled structure, which can affect the functionality of the fabricated device, such as in a multiple sensor read device.

In order to reduce any created topography, such as at the junction of the backfilled material with the structured layer, chemical-mechanical polishing (CMP) is known as a process for surface planarization. CMP can be successfully utilized to achieve planarization at the materials junction. However, it has be observed that other adjacent material zones, like the backfilled material within the structure, can dish inward as a result of the degree of CMP required at the junction.

Also, a CMP process utilizes a slurry that comprises abrasive particles within wet chemicals. It has also been observed that the wet chemical can invade the interface between the structured layer and the backfilled material causing a deleterious effect. Specifically, the wet chemical can etch or corrode the materials at the material interfaces.

SUMMARY

The present invention is directed to methods of planarizing materials, such as where surface topographies are created as part of a thin film device fabrication process. The present invention finds particular application in the creation of nano-sized devices, where surface topographical features can be effectively planarized without adversely creating other surface topographies and/or causing deleterious effects at material junctions.

In one aspect, the present invention is directed to a method of planarizing a multilayer structural device having a surface with a relief pattern created within a first material layer and with the relief pattern backfilled with a second material and creating a surface topography of the microelectronic device by a combination of the first and second materials. The method includes the steps of depositing a sacrificial layer of a third material over at least a portion of the first material layer, at least a portion of the backfilled second material, and a junction between the first and second materials, the sacrificial layer substantially retaining the surface topography of the microelectronic device; performing a chemical-mechanical planarization process on a surface of the sacrificial layer surface and planarizing the surface of the sacrificial layer and thus the surface topography of the microelectronic device, leaving a remainder portion of the thickness of the sacrificial layer; and physically removing the remainder of the sacrificial layer and, while removing the sacrificial layer, at some point also physically removing at least a portion of at least one of the first and second materials.

The method of the present invention can further include a step of depositing a film layer onto the surface of the microelectronic device after completion of the physical removal step of the remainder of the sacrificial layer. Preferably, the second material and the third material are physically removed at a similar removal rate. In one example, the second material and third material can be the same material.

In another aspect of the present invention, a method for device fabrication for the creation of multiple sensor read devices as usable within hard disk drives includes creating a relief pattern extending over at least a portion of a surface of a first material layer of the microelectronic device; backfilling the relief pattern with a second material and creating a surface topography of the microelectronic device by a combination of the first and second materials; depositing a sacrificial layer of a third material over at least a portion of the first material layer, at least a portion of the backfilled second material, and a junction between the first and second materials, the sacrificial layer substantially retaining the surface topography of the microelectronic device; performing a chemical-mechanical planarization process on a surface of the sacrificial layer surface and planarizing the surface of the sacrificial layer and thus the surface topography of the microelectronic device, leaving a remainder portion of the thickness of the sacrificial layer; and physically removing the remainder of the sacrificial layer and, while removing the sacrificial layer, at some point also physically removing at least a portion of at least one of the first and second materials.

BRIEF DESCRIPTION OF THE DRAWINGS

The disclosure may be more completely understood in consideration of the following detailed description of various embodiments of the disclosure in connection with the accompanying drawing, in which:

FIGS. 6A-6D are schematics illustrations of processes in accordance with the present invention including the deposition of a sacrificial layer over a backfilled structural thin film layer and undesired surface features, followed by a chemical mechanical polishing step and a further physical or dry chemical removal step;

DETAILED DESCRIPTION

The following specific embodiments of the present invention as set forth in the specification herein are for illustrative purposes only. Various deviations and modifications may be made within the spirit and scope of the invention without departing from the main theme thereof.

The following specific embodiments of the present invention as set forth in the specification herein are for illustrative purposes only. Various deviations and modifications may be made within the spirit and scope of the invention without departing from the main theme thereof.

Magnetic reproducing device embodiments described below relate to multi-sensor readers that include at least one feature that reduces inter-sensor spacing. It is understood that aspects of the present invention are also advantageous within single reader or other element fabrication. A description of an illustrative operating environment is provided below. Reference is made to U.S. Pat. No. 9,536,549, the entire contents of which are hereby fully incorporated by reference.

Figure 1:
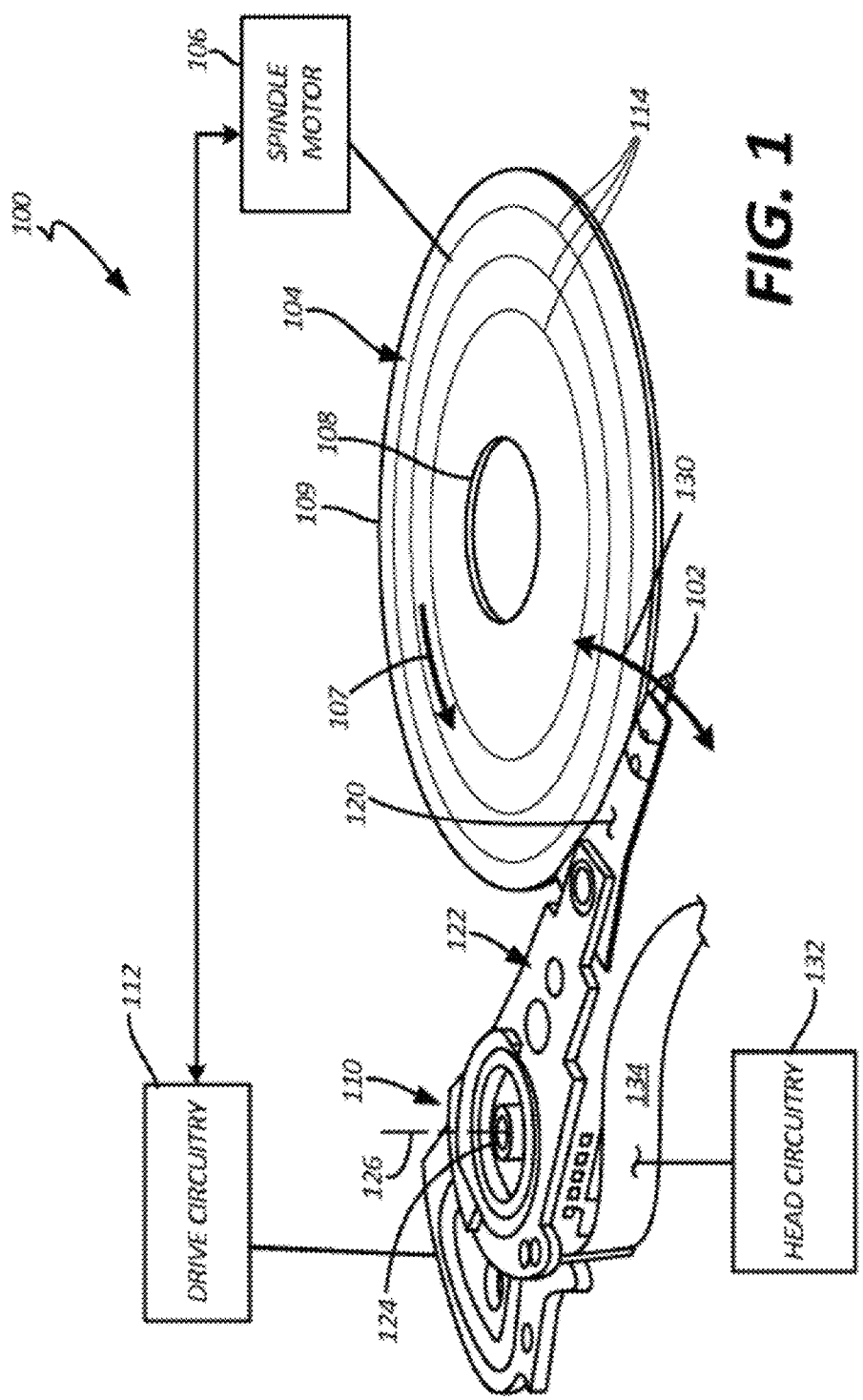
FIG. 1 is a schematic illustration of a data storage system including a data storage medium and a head for reading data form and/or writing to the data storage medium.

FIG. 1 shows an illustrative operating environment in which certain specific embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments. It should be noted that the same reference numerals are used in different figures for same or similar elements.

FIG. 1 is a schematic illustration of a data storage device 100 including a data storage medium and a head for reading data from and/or writing data to the data storage medium. In data storage device 100, head 102 is positioned above storage medium 104 to read data from and/or write data to the data storage medium 104. In the embodiment shown, the data storage medium 104 is a rotatable disc or other magnetic storage medium that includes a magnetic storage layer or layers. For read and write operations, a spindle motor 106 (illustrated schematically) rotates the medium 104 as illustrated by arrow 107 and an actuator mechanism 110 positions the head 102 relative to data tracks 114 on the rotating medium 104 between an inner diameter 108 and an outer diameter 109. Both the spindle motor 106 and actuator mechanism 110 are connected to and operated through drive circuitry 112 (schematically shown). The head 102 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross track direction as illustrated by arrow 130.

The head 102 includes one or more transducer elements (not shown in FIG. 1) coupled to head circuitry 132 through flex circuit 134. Details regarding elements of a head such as 102 are provided below in connection with FIG. 2.

Figure 2:
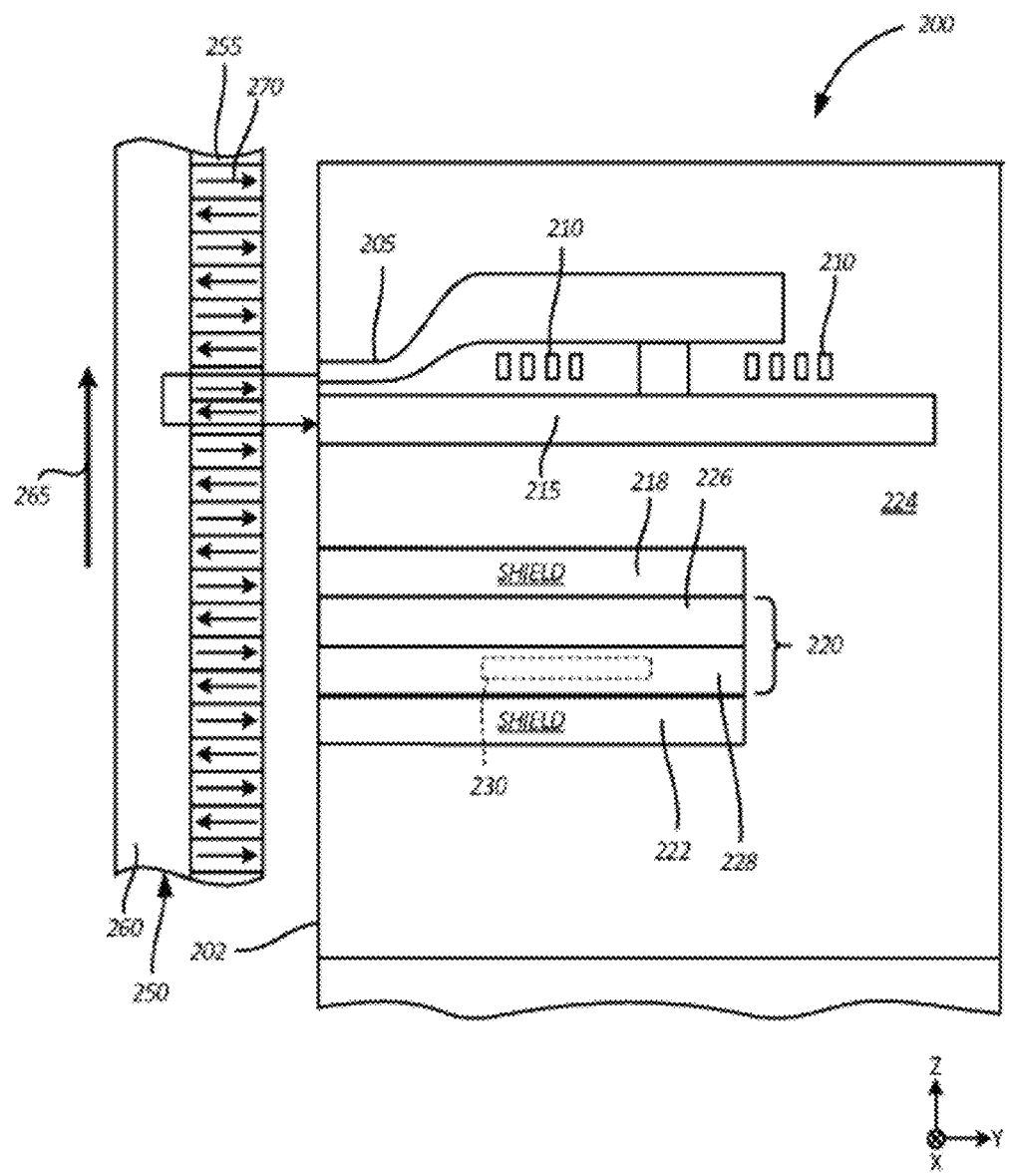
FIG. 2 is a schematic diagram of a cross-section of one embodiment of a recording head that reads from and writes to a storage medium.

FIG. 2 is a schematic diagram showing a cross-sectional view of portions of a recording head 200 and a data storage medium 250 taken along a plane substantially normal to a plane of a bearing surface (for example, an air bearing surface (ABS)) 202 of recording head 200. The recording head elements shown in FIG. 2 are illustratively included in a recording head such as recording head 102 in FIG. 1. Medium 250 is illustratively a data storage medium such as medium 104 in FIG. 1. Those skilled in the art will recognize that recording heads and recording media commonly include other components. Embodiments of the present disclosure are not limited to any particular recording heads or media.

Embodiments of the present disclosure may be practiced in different types of recording heads and media.

Recording head 200 includes a write pole 205, a magnetization coil 210, a return pole 215, a top shield 218, a read transducer 220, a bottom shield 222 and a wafer overcoat 224. Storage medium 250 includes a recording layer 255 and an underlayer 260. Storage medium 250 rotates in the direction shown by arrow 265. Arrow 265 is illustratively a direction of rotation such as arrow 107 in FIG. 1.

In an embodiment, electric current is passed through coil 210 to generate a magnetic field. The magnetic field passes from write pole 205, through recording layer 255, into underlayer 260, and across to return pole 215. The magnetic field illustratively records a magnetization pattern 270 in recording layer 255. Read transducer 220 senses or detects magnetization patterns in recording layer 255, and is used in retrieving information previously recorded to layer 255.

Figure 3A:
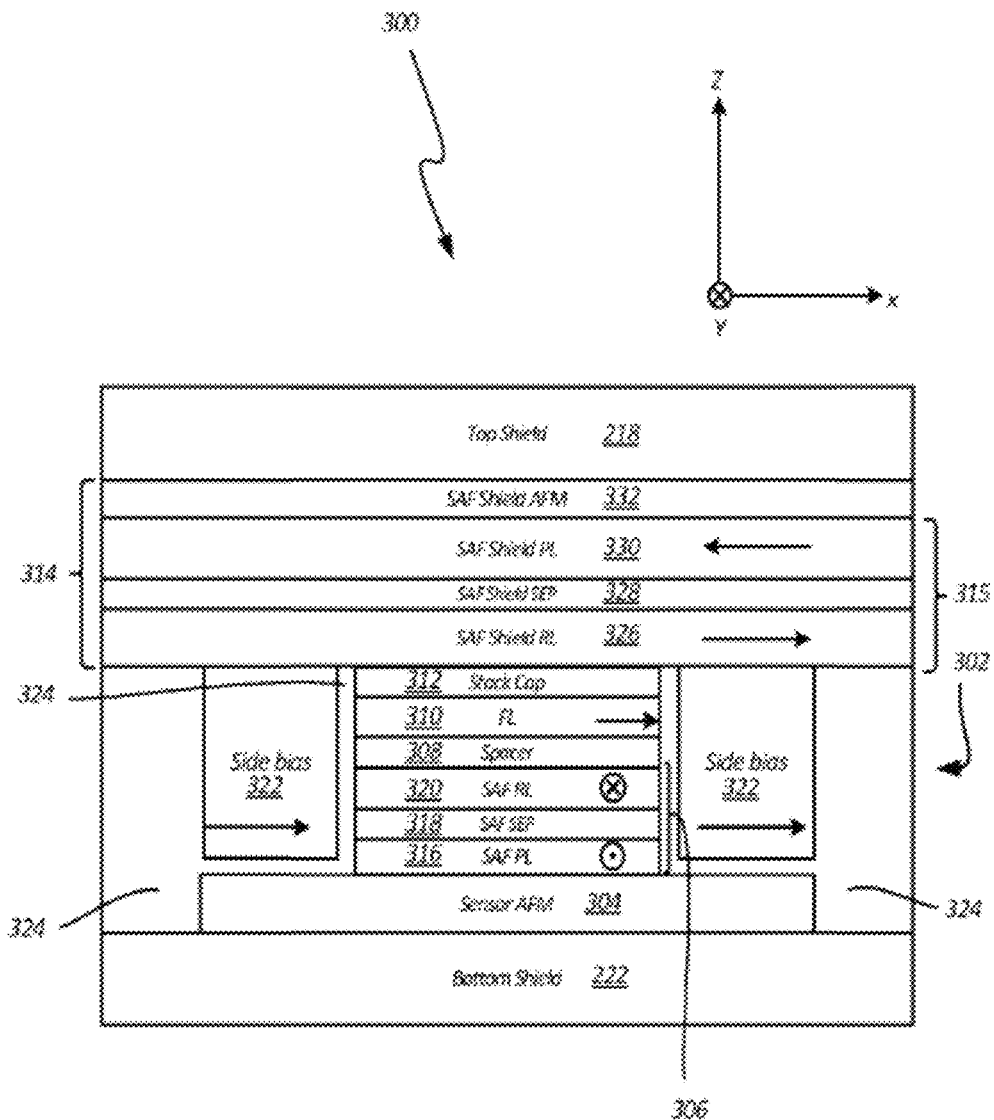
FIG. 3A is a bearing surface view of a magnetic reproducing device having a single read sensor.
Figure 3B:
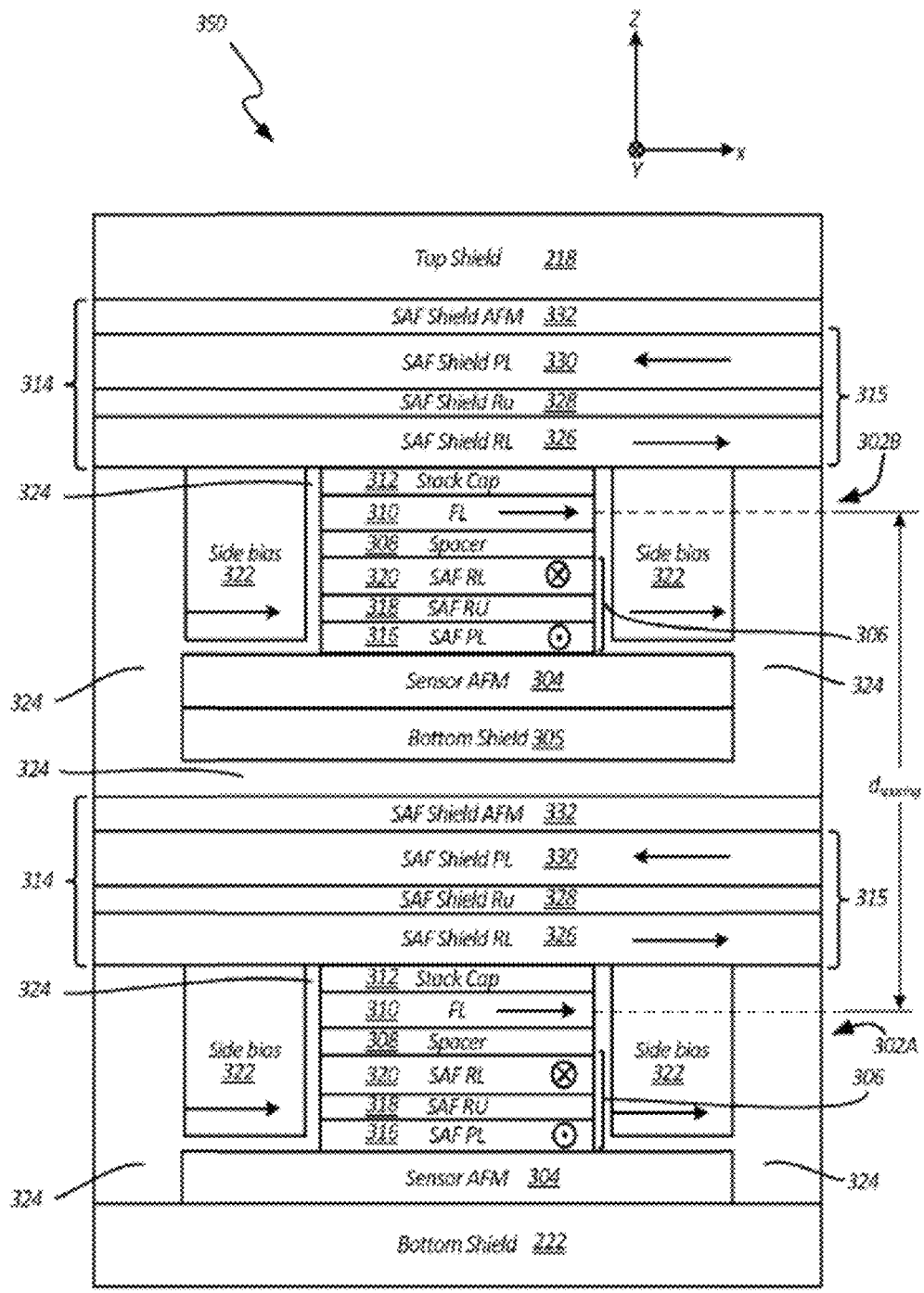
FIG. 3B is a bearing surface view of a magnetic reproducing device having multiple sensors of the type shown in FIG. 3A.

To address challenges posed by greater data density requirements and faster data transfer speeds, read transducer 220 includes multiple sensors 226 and 228. It should be noted that only two sensors 226 and 228 are shown in FIG. 2 in the interest of simplification. However, in different multi-sensor reader embodiments, any suitable number of sensors may be employed. In different multi-sensor reader embodiments, magnetic sensors may be stacked along a track direction (i.e., a z-direction in FIG. 2) or a track width direction that is perpendicular to the track direction (i.e., a cross-track direction, which is an x-direction in FIG. 2). A y-direction in FIG. 2 is then defined as a direction that is perpendicular to x and z simultaneously, which is a stripe-height direction. In the embodiment show in FIG. 2, sensors 226 and 228 are stacked along the track direction. In such embodiments, it is desirable to reduce spacing between primary sensing components of adjacent sensors 226 and 228 in order to achieve a high data storage density and because of head skew relative to the data tracks. Head skew is a natural result of the rotary actuator, which does not move the heads perfectly radially across the tracks, and is most pronounced near the inner and outer diameters of the disc (see FIG. 1). In the embodiment of FIG. 2, read transducer 220 includes at least one thickness/spacing reduction feature 230. Different layers of an embodiment of an individual sensor are shown in FIG. 3A, and FIG. 3B shows a multi-sensor reader including two sensors of the type shown in FIG. 3A. Details regarding inter-sensor spacing reduction in a multi-sensor reader are then provided further below in connection with FIGS. 4-11.

FIG. 3A is a schematic block diagram illustrating an example read head 300 including a single magnetoresistive sensor 302. The magnetoresistive sensor 302 is positioned between top shield 218 and bottom shield 222. Top and bottom shields 218 and 222, which may be made of a material having high magnetic permeability, reduce or substantially block extraneous magnetic fields, such as, for example, those from adjacent bits on data discs from impacting the magnetoresistive sensor 302, thus improving the performance of the magnetoresistive sensor 302. In one implementation, the top and bottom shields 218 and 222 permit magnetic fields from the bit directly under magnetoresistive sensor 302 to affect the magnetoresistive sensor 302, and thus be read.

The magnetoresistive sensor 302 includes a plurality of layers including a sensor antiferromagnetic (AFM) layer 304, a sensor stack synthetic antiferromagnetic (SAF) structure 306, a spacer layer 308, a free layer or sensing layer 310, a stack cap 312 and a SAF shielding structure 314.

In the embodiment shown in FIG. 3A, the sensor SAF structure 306 includes a pinned layer 316 a thin separation layer 318, which may comprise a metal such as ruthenium (Ru) in some embodiments, and a reference layer 320. The magnetic moments of each of the pinned layer 316 and the reference layer 320 are not allowed to rotate under magnetic fields in the range of interest (for example, magnetic fields generated by the bits of data stored on the data discs). The magnetic moments of the reference layer 320 and the pinned layer 316 are generally oriented normal to the plane (i.e., the y direction) of FIG. 3A and anti-parallel to each other.

In one implementation, the free layer 310 is not exchange coupled to, for example, an antiferromagnet. As a result, the magnetic moment of the free layer 310 is free to rotate under the influence of an applied magnetic field in a range of interest. The read head 300 further includes side biasing magnets or side shields 322, which produce a magnetic field that biases the free layer 310 with a magnetic moment parallel to the plane of the figure and generally oriented horizontally. This bias prevents the magnetic moment of the free layer 310 from drifting due to, for example, thermal energy, which may introduce noise into the data sensed by the read head 300. The bias is sufficiently small, however, that the magnetic moment of the free layer 310 can change in response to an applied magnetic field, such as a magnetic field of a data bit stored on the data discs. In some embodiments, the side biasing magnets or side shields 332 are formed of soft magnetic material (i.e., material that can be easily magnetized and demagnetized at relatively low magnetic fields). The soft magnetic material may be an alloy comprising Ni and Fe. The magnetoresistive sensor 302 is separated and electrically isolated from the side biasing magnets 322 by an isolation layer 324 including, for example, insulating materials. Isolation layer 324 may also be present in other regions of head 300 as shown in FIG. 3A.

In the embodiment shown in FIG. 3A, SAF shielding structure includes a SAF shield reference layer 326, a thin SAF shield separation layer 328, which may comprise a metal such as Ru in some embodiments, a SAF shield pinned layer 330 and a SAF shield AFM layer 332. Because sensor 300 utilizes soft side shields 322, SAF shield reference layer 326 needs to have a relatively fixed magnetization to assist in stabilizing the magnetizations of side shields 322. Thus, AFM layer 332 needs to pin the magnetization of layer SAF shield pinned layer 330 substantially parallel to the bearing surface, which results in the relatively fixed magnetization of SAF shield reference layer 326 due to antiferromagnetic coupling across SAF shield separation layer 328 and thus in stabilizing the magnetizations of the side shields 322 substantially parallel to the bearing surface as well. SAF shield reference layer 326 and SAF shield pinned layer 330 may be formed of a soft magnetic material (for example, an alloy comprising Ni and Fe). It should be noted that, in some embodiments, there may be non-magnetic metal inserts (not shown) between SAF shield AFM 332 and top shield 218, and between sensor AFM 304 and bottom shield 222.

In some embodiments, sensor 302 may utilize tunnel magnetoresistance (TMR) or giant magnetoresistance (GMR) effects. In embodiments that utilize TMR effects, spacer layer 308 is a tunneling barrier layer that separates the SAF structure 306 from the free layer 310. The tunneling barrier layer 308 is sufficiently thin that quantum mechanical electron tunneling occurs between a reference layer 320 in the SAF structure 306 and the free layer 310. The electron tunneling is electron-spin dependent, making the magnetic response of the magnetoresistive sensor 302 a function of the relative orientations and spin polarizations of the SAF structure 306 and the free layer 310. The highest probability of electron tunneling occurs when the magnetic moments of the SAF structure 306 and the free layer 310 are parallel, and the lowest probability of electron tunneling occurs when the magnetic moments of the SAF structure 306 and the free layer 310 are antiparallel. Accordingly, the electrical resistance of the magnetoresistive sensor 302 changes in response to an applied magnetic field. The data bits on the data discs in the disc drive may be magnetized in a direction normal to the plane of FIG. 3A, either into the plane of the figure, or out of the plane of the figure. Thus, when the magnetoresistive sensor 302 passes over a data bit, the magnetic moment of the free layer 310 is rotated either into the plane of FIG. 3A or out of the plane of FIG. 3A, changing the electrical resistance of the magnetoresistive sensor 302. The value of the bit being sensed by the magnetoresistive sensor 302 (for example, either 1 or 0) may therefore be determined based on the current flowing from a first electrode (not shown) to a second electrode (not shown) connected to the magnetoresistive sensor 302.

FIG. 3B is a schematic block diagram illustrating an example read head 350 including multiple magnetoresistive sensors (for example, 302A and 302B) stacked along a track direction (i.e., the z-direction in FIG. 3B). Each of sensors 302A and 302B is substantially similar to sensor 302 of FIG. 3A and therefore a description of individual sensors 302A and 302B is not provided in connection with FIG. 3B. It should be noted that, depending on a direction of rotation of the data storage medium and the head design, one of top shield 218 and bottom shield 222 is the leading shield for the entire read head such as 350 and the other one of top shield 218 and bottom shield 222 is the trailing shield for the entire read head such as 350. Sensor 302B has its own bottom shield denoted by reference numeral 305. It some embodiments, sensors 302A and 302B in sensor 350 may be isolated from each other by isolation layer 324, which is present in a region between sensors 302A and 302B in FIG. 3B. In other embodiments, no isolation layer may be employed between individual sensors.

As indicated above, in the multi-sensor configuration, a critical parameter is the FL-to-FL spacing, d (in FIG. 3B), and is set by the additive thicknesses of a sensor and the shielding structures and insulator between the sensors. Further, as noted above, reducing d enables the multi-sensor reader to be implemented in a higher linear density drive and to perform suitably under skew. Several techniques for reducing FL-to-FL spacing in a multi-sensor reader are described below in connection with FIGS. 4-11. The different techniques involve modifications to shielding structure 314 and/or to isolation layer 324. The modifications may include forming one or more layers of the shielding structure 314 and/or the isolation layer 324 with materials selected to enable a reduction in thickness of the one or more layers of the shielding structure 314 and/or the isolation layer 324. The modifications may also include structural design changes to shielding structure 314 (i.e., changes to shielding element 315 and/or to an element such as 332, which stabilizes the shielding element 315).

Figure 4:
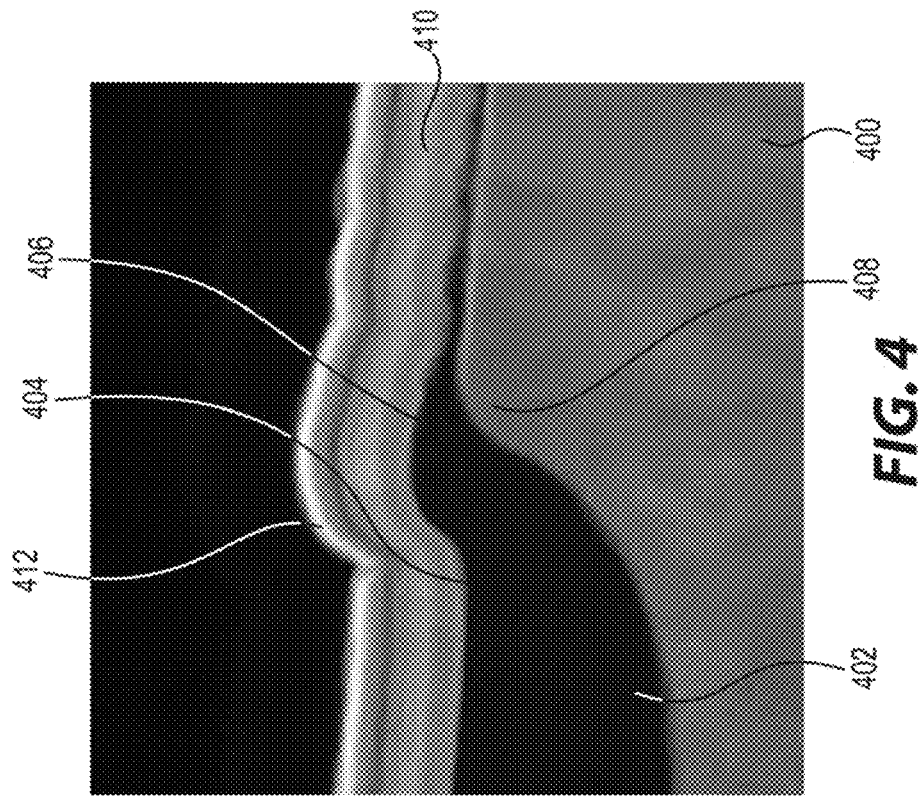
FIG. 4 is an illustration of a microstructural device portion of a thin film layer that includes a structural recess that is backfilled with material and where the backfilled structural thin film layer is covered by a thin film layer, wherein a bump is formed at an interface of the backfilled material and the structured thin film.

In FIG. 4, a microstructural device portion is illustrated as comprising a thin film layer 400 that has been fabricated to have a structural recess 402 within the thickness of the layer 400. The structural recess could otherwise extend through the thickness of the layer 400, or through or within any number of layers. The structural recess 402 can be formed in any known or development manner. As above, with the use of a hard mask or a pattern of photoresist (neither shown), any number of structural recesses 402 can be milled (such as by ion milling) or etched within the layer 400 in accordance with the illustrated example.

To fabricate a read element transducer, for example, the recess 402 is preferably backfilled with a material 404 that is different from the material making up the structured layer 400. A deposition step of material 404 for backfilling the recess 402 can be conducted as known or developed, such as by deposition of the material 404 prior to liftoff of a hard mask or photoresist stripping (not shown). FIG. 4 shows the structured layer 400 with its recess structure 402 backfilled with material 404.

As discussed above in the Background section, at the nanometer level, it is common for a bump 406 to form at the top surface of the interface 408 between the material 404 and the material of the structured layer 400 adjacent to the recess 402. Such a bump 406 can result from what is known as a shadow effect from the mask or photoresist (not shown) from the fabrication process steps described above, and/or can be a result of the deposition process for backfilling the recess 402 with the material 404.

A layer 410 is illustrated as deposited to overlay the structured layer 400 including over the structured recess 402 as backfilled with material 404 and with the bump 406. This layer 410 could be a metal layer in the case of a read transducer fabrication. Layer 410 clearly shows a propagation of the bump 406 through the layer 410 as at 412. The topography of the structured layer 400 including the topography created by backfilling the recess 402 with the material 404 is propagated similarly to the top surface of the layer 410. In the case of fabricating multiple sensor read devices, such surface topographic features could be in the range of from 10-100 nanometers, which features can affect the functionality of these devices. This is especially true where multiple devices like multiple readers are stacked on one another as with the MSMR head design (noted above), as a second reader would include a topography propagated to it from a first reader along with any created topographical features in fabricating the second reader. The more layers of the devices and the number of stacked devices, the greater the problem.

Figure 5:
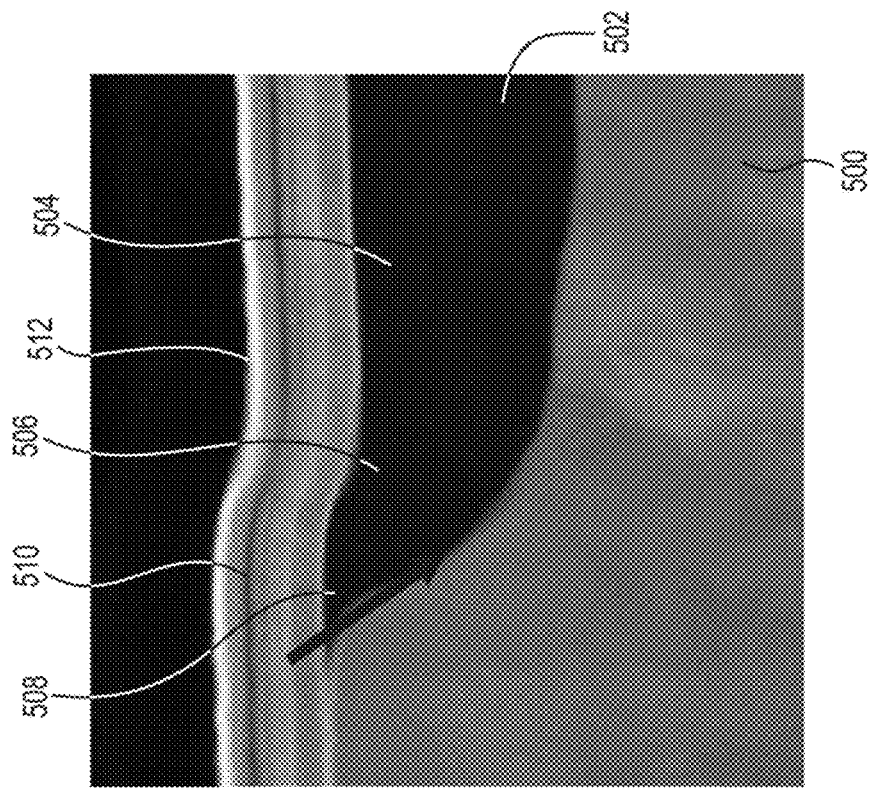
FIG. 5 is another illustration of a microstructural device portion similar to that of FIG. 4, but with the additional thin film layer deposited onto the backfilled structural thin film layer after a bump formed at the interface has been planarized.

In FIG. 5, a similar fabrication as that of FIG. 4 is illustrated, but illustrating a different topographical feature as can be propagated within a multilayer fabrication. A structured layer 500 is fabricated to have a structural recess 502, as can be made in the same manner as that described above with respect to FIG. 4. The result would be similar to that of FIG. 4 with the formation of bump 406 based upon milling and deposition through a hard mask or photoresist (not shown), as above.

However, in FIG. 5, the fabrication is shown after the structural recess 502 is backfilled with material 504 and further after a top surface of the backfilled structural layer 500 is planarized. Planarization can be conducted such as by a CMP technique as such techniques are well known. After a CMP process is conducted on such a structured surface, it has been observed that a dished or recessed surface area 506 can result. This can happen because of differences of the materials of the structured layer 500 as compared with the backfilling material 504 and on the process steps of the CMP and composition of the chemical etch and abrasive particles of the CMP itself. Moreover, a CMP process can have a deleterious effect at an interface 508 of the structured layer 500 within its structural recess 502 with the material 504 that is backfilled into the recess 502. Chemical of the CMP process can find its way along such interface for some distance and that chemical can etch or corrode either or both materials along the interface 508.

Like in FIG. 4, the FIG. 5 illustration includes a layer 510 as may be deposited for overlying the top surface of the structured layer 500 with the backfilled recess 502. The layer 510 could be a metal layer in the case of a read transducer fabrication. Layer 510 clearly shows a propagation of the dish 506 through the layer 510 as at 512. The topography of the structured layer 500 including the topography created by backfilling the recess 502 with the material 504 followed by a planarization step is propagated similarly to the top surface of the layer 510. As above, in the fabricating of multiple sensor read device features, such surface topographic features could be in the range of from 10-100 nanometers, which features can affect the functionality of these devices. This is especially true where multiple devices like multiple readers are stacked on one another as with the MSMR head design (noted above), as a second reader would include a topography propagated to it from a first reader along with any created topographical features in fabricating the second reader. As above, the more layers of the devices and the number of stacked devices, the greater the problem. As such, even with a planarization process such as a CMP process added to remove bump type surface topography, other topography features can exist and propagate to covering layers, and other undesirable affects can occur.

FIGS. 6A-6D together provide a schematic illustration of processes of the present invention utilizing the steps and techniques discussed above but with variations and additional steps to achieve better surface planarization prior to the deposition of additional layers to a backfilled structural layer.

Specifically, a structural layer 600 is shown in FIG. 6A as fabricated with a structural recess 602 and that is backfilled by material 604. Surface topographical features 605 and 606 are illustrated as high spots of the backfilled material 604 at an interface of the structural layer 600 and backfilled material 604 and at spaced therefrom at an intermediate location of the recess 602. These surface topological features are shown as examples of any such topological features which could be more or less in number. Preferably, the backfilling with material 604 will be done to at least fully fill the recess 602 so that there are no low spots of the material 604 below the top surface of the structural layer 600. As above, these surface features 605 and 606 can be in the range of about 10-100 nanometers for multiple sensor read device feature fabrication, although the steps of the present invention can be performed regardless of feature size.

Prior to performing any planarization step, a sacrificial layer 620 of a third material, as compared to the first material making up the structural layer 600 and the second material making up the backfilling material 604, is deposited onto the top surface of the backfilled structural layer 600 with an undesirable surface topography. As can be seen in the schematic illustration at FIG. 6B, the sacrificial layer 620 preferably overlies the surface topographical features that are desired to be eliminated and, like the layers 410 and 510 discussed above, inherit the topographical features. High points 622 and 624 are the propagations of the features 605 and 606 of the backfilled structural layer 600, respectively. Preferably, the sacrificial layer 620 is thicker than the highest topographical feature of the backfilled structural layer 600. More preferably, the sacrificial layer is of a greater thickness to allow for planarization of the features 622 and 624 at a higher rate than the rate of planarization of the surrounding material of the sacrificial layer, as described below.

Preferably for planarizing the top surface of the sacrificial layer 620, CMP is conducted. The material making up the sacrificial layer is preferably a material that can easily be removed by CMP and that will be removed a higher rate where there are topographical propagations, like at 622 and 624. It is desirable that the features like 622 and 624 will quickly be removed by CMP followed by an even overall removal of at least some further portion of the sacrificial layer toward the top surface of the backfilled structural layer 600.

As shown in FIG. 6C, the CMP step will preferably leave the backfilled structural layer 600 with a relatively thin layer of the sacrificial layer 620 remaining to cover the top surface of the structural layer 600 including any formed topographic features, like high spots 605 and 606. The sacrificial layer portion remaining after CMP is preferably to be a smooth surface (as defined on a nanometer scale) without any portion of any high feature 605 or 606, for example, protruding beyond the top surface of the sacrificial layer (a feature can come just to the same level and be smooth). In this process, any interface between the structural layer 600, such as at the structural recess 602 and the backfilled material 604, is shielded from the chemicals of the CMP process. This eliminates any corrosion along such interface. At this point, the top surface of the multilayer portion of the fabrication is smoothed to a sufficient level that is desired for the final smoothness of the fabricated device.

A next step in accordance with the present invention is a physical or wet chemical removal process by which the materials of the sacrificial layer 620 and the high spots 605 and 606, for example, will remove evenly. Sputter etching and ion milling are preferred methods, but it is understood that any other dry chemical or physical process as known or developed can be utilized with the preferable control being that the materials can be removed evenly down to the top layer of the structural layer 600. Preferred processes will remove the material on an atomic or micro level. By smoothing the surface topography prior to this removal step and by controlling this removal step to remove material evenly, a smooth final device surface is ensure as the top surface of the backfilled structural layer 600.

FIG. 6D illustrates such a device portion of a structured layer 600 that has been planarized by removal of the remaining sacrificial layer 620 and surface topographical features 605 and 606. The result is a smooth top surface that mimics the smooth surface as was created on the sacrificial layer after the CMP process. FIG. 6D further shows the deposition of a functional device layer 610, which inherits the surface smoothness of the planarized structural layer 600. This functional layer 610 can be a GMR or TMR reader stack as in a multiple sensor read device.

Figure 7:
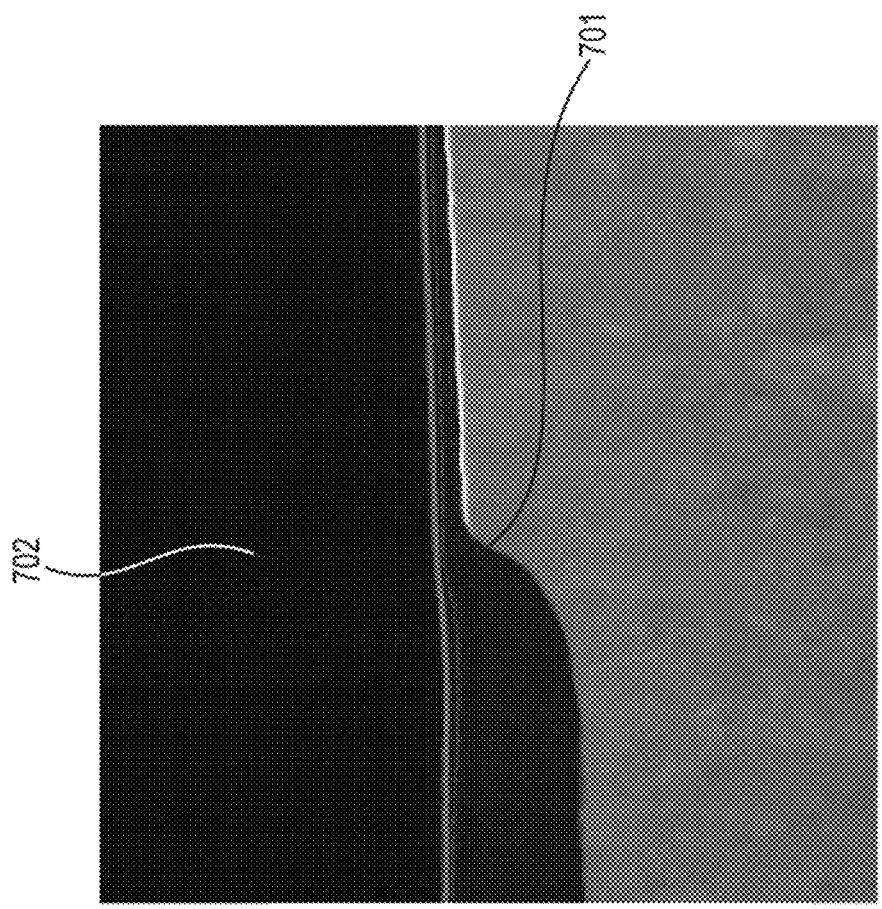
FIG. 7 is a view similar to that of FIG. 4, but illustrating the microstructural device portion after being processed in accordance with the steps of FIGS. 6A-6D.

FIG. 7 is a view similar to that of FIG. 4 but with much less surface variations and increased smoothness as obtained in accordance with a process of the present invention. Specifically, at 701, a slight feature is present as formed from the features of FIG. 6A in the above schematic example (as would be present after mask liftoff or photoresist stripping). However, after the planarization steps of the present invention as in FIG. 6C, point 702 shows a significantly smoother surface at the external surface of the point 701, which otherwise would have inherited a significant surface variation.

The invention claimed is:

1. A method of planarizing a multilayer thin film device having a surface with a relief pattern created within a first material layer and with the relief pattern backfilled with a second material and creating a surface topography of the microelectronic device by a combination of the first and second materials, the method comprising the steps of:

depositing a sacrificial layer of a third material over at least a portion of the first material layer, at least a portion of the backfilled second material, and a junction between the first and second materials, the sacrificial layer substantially retaining the surface topography of the microelectronic device;

performing a chemical-mechanical planarization process on a surface of the sacrificial layer surface and planarizing the surface of the sacrificial layer and thus the surface topography of the multilayer device, leaving a remainder portion of the thickness of the sacrificial layer; and physically removing the remainder of the sacrificial layer and, while removing the sacrificial layer, at some point also physically removing at least a portion of at least one of the first and second materials.

2. The method of claim 1 further including a step of depositing a film layer onto the surface of the microelectronic device after completion of the physical removal step of the remainder of the sacrificial layer.

3. The method of claim 1, wherein the second material and the third material are physically removed at a similar removal rate.

4. The method of claim 3, wherein the second material and third material are the same material.

5. The method of claim 1, wherein the physical removal step includes a sputter etching step.

6. The method of claim 1, wherein the physical removal step includes an ion milling step.

7. The method of claim 1, further in that the method comprises steps of creating a multiple sensor read device.

8. A method of microelectronic device fabrication for the creation of multiple sensor read elements as usable within hard disk drives, the method comprising the steps of:

creating a relief pattern extending over at least a portion of a surface of a first material layer of the microelectronic device;

backfilling the relief pattern with a second material and creating a surface topography of the microelectronic device by a combination of the first and second materials;

depositing a sacrificial layer of a third material over at least a portion of the first material layer, at least a portion of the backfilled second material, and a junction between the first and second materials, the sacrificial layer substantially retaining the surface topography of the microelectronic device;

performing a chemical-mechanical planarization process on a surface of the sacrificial layer surface and planarizing the surface of the sacrificial layer and thus the surface topography of the multilayer device, leaving a remainder portion of the thickness of the sacrificial layer; and physically removing the remainder of the sacrificial layer and, while removing the sacrificial layer, at some point also physically removing at least a portion of at least one of the first and second materials.

9. The method of claim 8, further including a step of depositing a film layer onto the surface of the microelectronic device after completion of the physical removal step of the remainder of the sacrificial layer.

10. The method of claim 8, wherein the second material and the third material are physically removed at a similar removal rate.

11. The method of claim 10, wherein the second material and third material are the same material.

12. The method of claim 8, wherein the physical removal step includes a sputter etching step.

13. The method of claim 8, wherein the physical removal step includes an ion milling step.

* * * * *